United States Patent
Tingley

(10) Patent No.: US 6,173,550 B1
(45) Date of Patent: *Jan. 16, 2001

(54) WOOD I-BEAM CONDITIONED REINFORCEMENT PANEL

(76) Inventor: Daniel A. Tingley, 3310 SW. WIllamette Ave., Corvallis, OR (US) 97333

(*) Notice: Under 35 U.S.C. 154(b), the term of this patent shall be extended for 0 days.

This patent is subject to a terminal disclaimer.

(21) Appl. No.: 09/250,768

(22) Filed: Feb. 15, 1999

Related U.S. Application Data

(63) Continuation-in-part of application No. 08/404,350, filed on Mar. 15, 1995, which is a continuation-in-part of application No. 08/330,438, filed on Oct. 28, 1994, now Pat. No. 5,648,138, which is a continuation-in-part of application No. 08/206,411, filed on Mar. 4, 1994, now Pat. No. 5,641,553, and a continuation-in-part of application No. 08/037,580, filed on Mar. 24, 1993, now Pat. No. 5,362,545.

(51) Int. Cl.$^7$ .................................................. E04C 3/12
(52) U.S. Cl. ..................... 52/729.1; 52/729.2; 52/729.4; 52/730.7; 52/731.1
(58) Field of Search .............................. 52/729.2, 729.4, 52/730.7, 731.1, 729.1, 729.3; 428/120, 902, 255, 247

(56) References Cited

U.S. PATENT DOCUMENTS

| | | |
|---|---|---|
| 2,391,049 | 9/1945 | Weiller . |
| 2,536,183 | 1/1951 | Jamieson . |
| 3,413,188 | 11/1968 | Allen . |
| 3,890,077 | 6/1975 | Holman . |
| 4,108,351 | 8/1978 | Hough . |
| 4,195,462 | 4/1980 | Keller et al . |
| 4,242,406 | 12/1980 | El Bouhnini et al. . |
| 4,312,162 | 1/1982 | Medney . |
| 4,336,678 | 6/1982 | Peters . |
| 4,413,459 | 11/1983 | Lambuth . |
| 4,456,497 | 6/1984 | Eberle . |
| 4,615,163 | 10/1986 | Curtis et al. . |
| 4,715,162 | 12/1987 | Brightwell . |
| 4,965,973 | 10/1990 | Engebretsen . |

(List continued on next page.)

FOREIGN PATENT DOCUMENTS

| | | | |
|---|---|---|---|
| 79761 | 5/1983 | (EP) | .................................... 52/729.1 |
| 0402099 | * 12/1990 | (EP) | .............................. D03D/13/00 |
| 4149346 | 5/1992 | (JP) . | |
| 9102865 | * 3/1991 | (WO) | ............................... E04C/3/29 |

OTHER PUBLICATIONS

Rowlands et al., "Fiber–Reinforced Wood," *Wood and Science*, V. 18(1) (Jan. 1986), pp. 39–57.

(List continued on next page.)

* cited by examiner

Primary Examiner—Carl D. Friedman
Assistant Examiner—Phi Dieu Tran A
(74) Attorney, Agent, or Firm—Stoel Rives LLP

(57) ABSTRACT

The present invention includes wood I-beams with fiber reinforcement. In a preferred embodiment, a wood I-beam includes an opposed pair of elongated wood flanges and a substantially continuous web positioned between them. In one embodiment, the web includes multiple metal tubes that extend between the wood flanges and form a zig zag pattern. The ends of the metal tubes are flattened parallel to the plane of the metal web so the ends can fit within either slots in the top surface of the bottom wood flange or slots in the bottom surface of the top wood flange. Metal pins pass through the sides of the wood flanges and the flattened ends of the metal tubes to secure the tubular metal web to the flanges. In other embodiments the web includes oriented strand board (OSB) or plywood. Reinforcements are adhered to the wood flanges so that the metal pins also pass through the reinforcements. The reinforcements preferably include multiple fiber strands held within a resin matrix.

37 Claims, 3 Drawing Sheets

U.S. PATENT DOCUMENTS

| | | |
|---|---|---|
| 4,967,534 | 11/1990 | Lines . |
| 5,000,808 | 3/1991 | Deviney . |
| 5,006,390 | 4/1991 | Kavesh et al. . |
| 5,026,593 | 6/1991 | O'Brien . |
| 5,120,378 | 6/1992 | Porter et al. . |
| 5,135,793 | 8/1992 | Socha . |
| 5,323,584 | 6/1994 | Scarlett . |
| 5,520,995 * | 5/1996 | Fukushima et al. .................. 428/216 |
| 5,547,729 | 8/1996 | Tingley . |
| 5,552,214 * | 9/1996 | Kobomura et al. ................... 428/294 |
| 5,567,535 * | 10/1996 | Pettit .................................... 428/608 |
| 5,935,698 * | 8/1999 | Pannell ................................. 428/223 |

OTHER PUBLICATIONS

Wood Design Focus, A Newsletter of Contemporary Wood Engineering, vol. 4, No. 2 (Summer 1993), R.J. Leichti, Editor.

Von de Kuilen, Proceedings of the 1991 International Timber Engineering Conference, vol. 3, (Sep. 2–5, 1991), pp. 226–233.

Tingley, Proceedings of the 1988 International Conference on Timber Engineering, vol. 1, (Sep. 19–22, 1988), pp. 422–427.

Tingley, Reinforced Glued–Laminated Wood Beams, 96 page Thesis accepted Nov., 1987 by the University of New Brunswick (Canada) as partial fulfillment for M.S. Eng., Dept. of Civil Engineering.

Tingley, "Predicting Strength Criteria for Kevlar and Fiberglass Reinforced Plastic (KRP & FRP) Glued Laminated Beams," pp. 301–304 from vol. 2 of the Proceedings of the Second *Pacific Engineering Conference*, 1989.

WOOD I-BEAM CONDITIONED REINFORCEMENT PANEL

RELATED APPLICATION

This application is a continuation-in-part of copending application No. 08/404,350, filed Mar. 15, 1995, which is a continuation-in-part of application No. 08/330,438, filed Oct. 28, 1994 is now U.S. Pat. No. 5,648,138, which is a continuation-in-part of application No. 08/206,411, filed Mar. 4, 1994 is now U.S. Pat. No. 5,641,553, and application No. 08/037,580, filed Mar. 24, 1993, now U.S. Pat. No. 5,362,545.

TECHNICAL FIELD

The present invention relates to wood structural members and, in particular, to improved wood I-beams.

BACKGROUND OF THE INVENTION

Beams, trusses, joists, and columns are the typical structural members that support the weight or loads of structures, including buildings and bridges. Structural members may be manufactured from a variety of materials, including steel, concrete, and wood, according to the structure design, environment, and cost.

Wood structural members are now typically manufactured from multiple wood segments that are bonded together, such as in glue-laminated members, laminated veneer, parallel strand wood and I-beams. These manufactured wood structural members have replaced sawn lumber or timbers because the former have higher design limits resulting from better inspection and manufacturing controls. Wood is a desirable material for use in many structural members because of its various characteristics, including strength for a given weight, appearance, cyclic load response, and fire resistance.

Wood I-beams can be manufactured with a wide variety of structural components. Generally, wood I-beams include a pair of parallel wood or manufactured wood flanges that are secured along their lengths to a transverse web material that can be formed of wood, manufactured wood, or steel.

FIG. 1 is an exploded side elevation of a conventional steel web wood I-beam 10 of a type widely used as beams, floor joists, and roof joists. Steel web wood I-beam 10 includes an opposed pair of elongated wood flanges 12 and 14 that have positioned between them multiple straight steel tubes 16 arranged in a zig zag pattern as a substantially continuous tubular steel web 18. Wood flanges 12 and 14 typically are formed of multiple wood sections 20 that are joined at their ends by finger joints 22.

In this embodiment, the web members 16 are formed from steel tubes 16 having ends 24 that are flattened parallel to the plane of web 18 to fit within either slots 26 in top surface 28 of wood flange 12 or similar slots (not shown) in bottom surface 32 of wood flange 14. Pins 34 made of metal, wood, or plastic pass through the sides of wood flanges 12 and 14 and flattened ends 24 of the steel tubes 16 so that tubular steel web 18 is secured to flanges 12 and 14.

Conventional manufacturing practices provide steel web wood I-beams that are of generally high quality and have generally high design limits that include having adequate stiffness to meet application deflection criteria. These manufacturing practices typically specify the grade of wood used to form flanges 12 and 14, the type and size of steel tubes 16, the pitch of the zig zag pattern formed by steel web 18, the size and placement of pins 34 and 54, and the size and form of flanges 12 and 14.

In conventional manufacturing practices, wood flanges 12 and 14 are formed of high grade wood so that flanges 12 and 14 can withstand the tensile and compressive forces applied to the I-beam, the shearing forces exerted by pins 34 and 54, and the pressure in flanges 12 and 14 adjacent pins 34. Finger joints 18 have a strength that is typically at least about 60 percent of the strength of the wood that is joined together. High grade wood is also required so that finger joints 18 have at least a minimum strength to prevent a localized failure that could lead to total failure or collapse of the beam.

Knots and slope of grain variations are typically avoided in flanges 12 and 14 because they can initiate localized failure under compression. The limited availability of affordable high quality wood can greatly increase the cost of steel web wood I-beams or require use of oversized flanges of lower quality wood. Moreover, conventional steel web wood I-beams suffer from the disadvantage of failing completely whenever tension flange failure occurs.

Furthermore, stiffness is a major consideration in the design of wood I-beams. The flange construction and material of the reinforcement panel all contribute to beam stiffness.

SUMMARY OF THE INVENTION

An object of the present invention is, therefore, to provide wood I-beams with wood or wood composite flanges having fiber reinforcement.

Another object of this invention is to provide metal or wood web wood I-beams with improved capability of bearing shearing forces and pressures exerted on the flanges by pins securing the web.

A further object of this invention is to provide web wood I-beams with reduced susceptibility to total beam failure resulting from flange failure.

Still a further object of this invention is to provide a wood I-beam with improved flange stiffness.

The present invention includes wood I-beams with fiber reinforcement. In a preferred embodiment, a steel web wood I-beam includes an opposed pair of elongated wood flanges, which include wood composite flanges, and a substantially continuous tubular metal (e.g., steel) web positioned between them. The tubular steel web includes multiple metal tubes that extend between the wood flanges and form a zig zag pattern. The ends of the metal tubes are flattened parallel to the plane of the metal web so the ends can fit within either slots in the top surface of the bottom wood flange or slots in the bottom surface of the top wood flange.

Metal pins pass through the sides of the wood flanges and the flattened ends of the metal tubes to secure the tubular metal web to the flanges. Reinforcements are adhered to the wood flanges so that the pins also pass through the reinforcements. The reinforcements preferably include multiple fiber strands held within a resin matrix. The wood flanges preferably include multiple elongate wood segments are bonded together with their lengths generally aligned with the length of the I-beam and the reinforcements are bonded either between elongate woods segments or on another surface of one of the flanges.

Failure in conventional steel web wood I-beams typically occurs in a flange, in cleavage, compression, or tension, in the vicinity of the pins coupling the flanges and metal web. Lateral buckling of the compression flange also occurs. The reinforcements provide the wood flanges of this invention with enhanced resistance to these failure modes, as well as to failure in the vicinity of finger joints where portions of the wood flanges are joined end-to-end and to failure in the vicinity of local defects in the flanges (e.g., knots in compression-side flange). As a result, metal web wood I-beams of this invention can be manufactured with flanges of lower grades of wood and have comparable or greater strength than conventional steel web wood I-beams. Also, the reinforcements function to increase the ductility ratio (i.e., the ultimate load over the yield point load) of wood I-beams and to prevent the wood flanges from completely failing, thereby providing improved safety characteristics.

In another preferred embodiment, reinforcement according to the present invention is employed with wood I-beams having other web materials such as, for example, a wood web and oriented strand board. Such reinforced wood I-beams also have improved load bearing capabilities and failure characteristics. Various other wood materials are also suitable for the flanges of wood I-beams, including laminated veneer wood, parallel strand wood, and solid sawn lumber. The wood flanges and/or the solid wood web may additionally be made from reconstituted wood, such as wood particles held together in a resin matrix. Additionally, the wood flanges and/or the solid wood web my be made of plywood, oriented strand board, laminated veneer, or parallel strand lumber.

Additional objects and advantages of this invention will be apparent from the following detailed description of preferred embodiments thereof which proceeds with reference to the accompanying drawings.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 3:
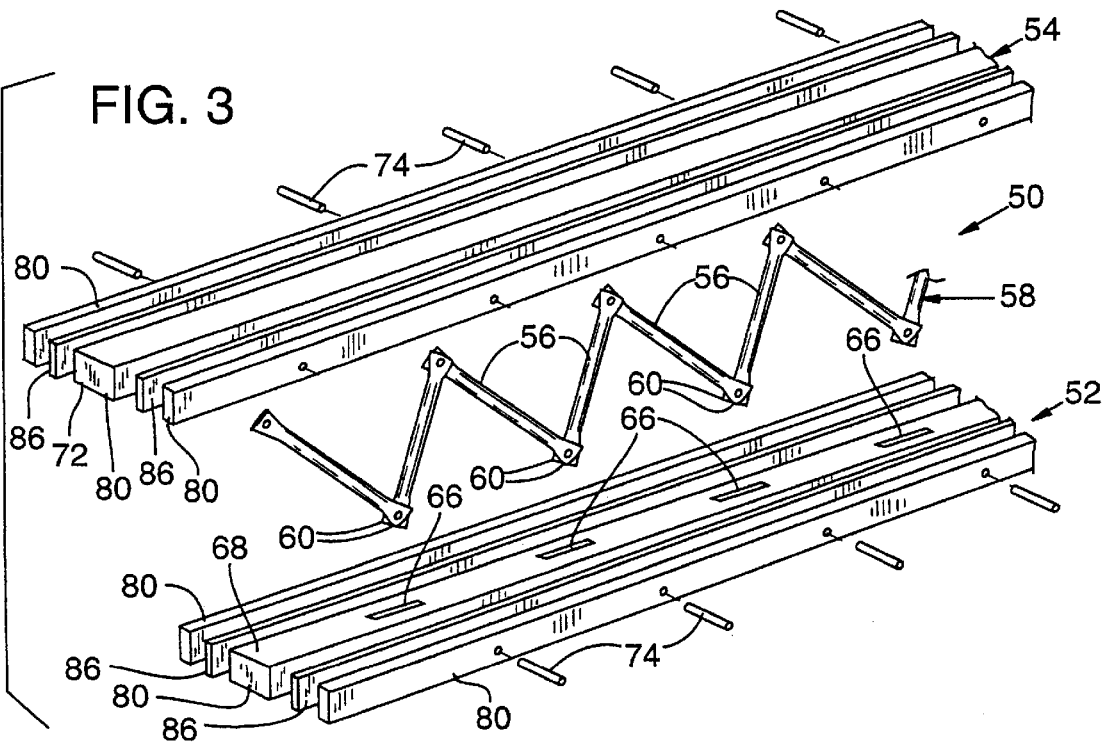
FIG. 3 is an exploded isometric view of a portion of a metal web wood I-beam with a reinforcement according to the present invention.
Figure 4:
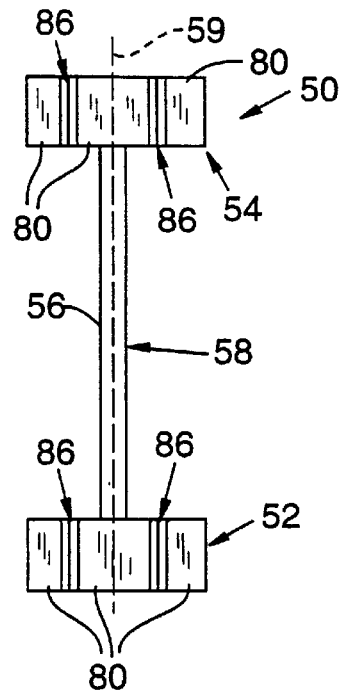
FIG. 4 is an end view of a metal web wood I-beam with a fiber reinforcement according to the present invention.

FIGS. 3 and 4 show a metal web wood I-beam 50 that includes an opposed pair of elongated wood flanges 52 and 54 that have positioned between them multiple straight metal (e.g., steel) tubes 56 arranged as a substantially continuous tubular metal web 58 that preferably forms a zig zag pattern and defines a plane 59 (FIG. 4) that extends through flanges 52 and 54. Metal tubes 56 have ends 60 that are flattened parallel to plane 59 of metal web 58 to fit within either slots 66 in top surface 68 of flange 52 or similar slots (not shown) in bottom surface 72 of flange 54. Metal pins 74 pass through the sides of flanges 52 and 54 and flattened ends 6C of tubes 56 to secure them to flanges 52 and 54.

Figure 1:
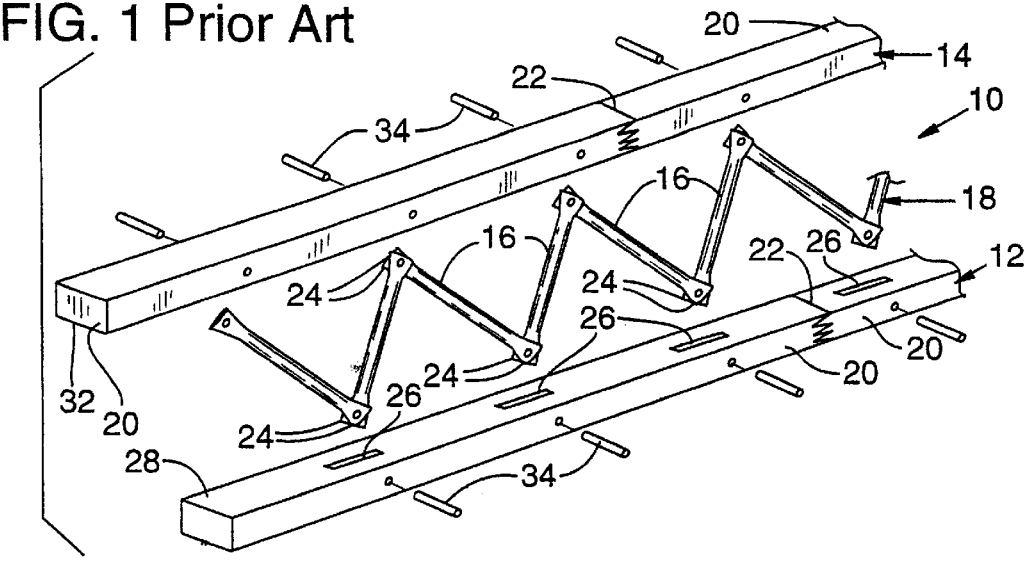
FIG. 1 is an exploded side elevation of a conventional metal web wood I-beam.
Figure 2:
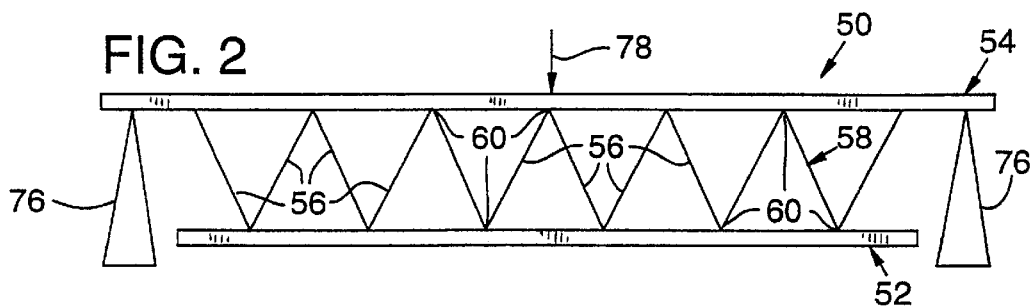
FIG. 2 is a side elevation of a metal web wood I-beam with fiber reinforcement according to the present invention.

A typical structural use of metal web wood I-beam 50 is to extend as a beam or joist over and bear a load along an otherwise open region. As a simplified, exemplary representation of such use, metal web wood I-beam 50 is shown in FIG. 2 with its ends supported by a pair of blocks 76 and bearing a point load 78 midway between blocks 76. It will be appreciated, however, that metal web wood I-beam 50 of the present invention could also bear loads distributed in other ways or be used specifically as a truss, roof joist, or floor joist.

Figure 7:
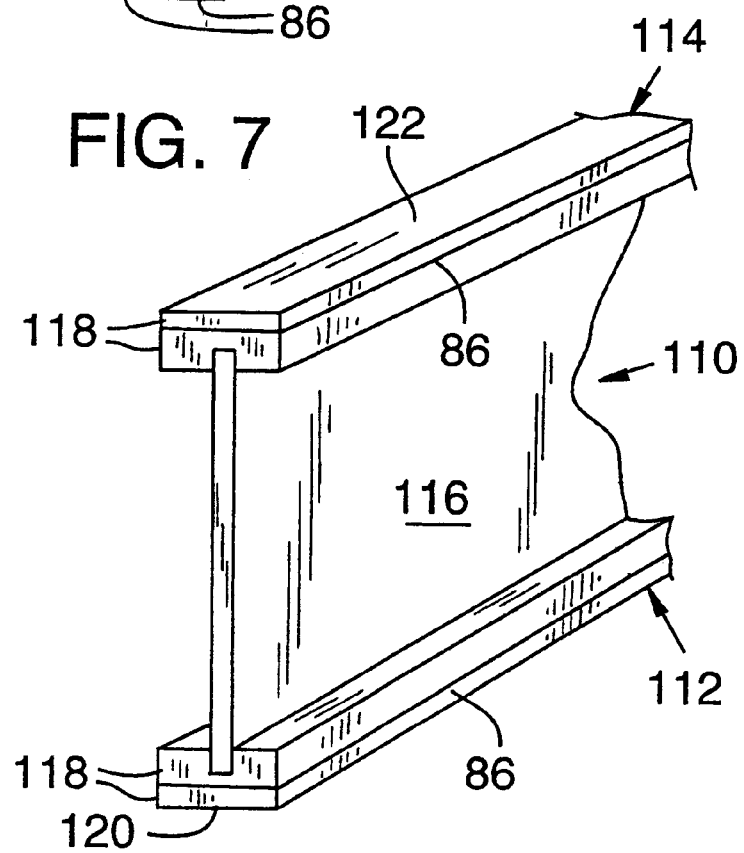
FIG. 7 is a partial view of an I-beam of the present invention with a fiber reinforcement located on an outer surface of one of the I-beam flanges.

Flanges 52 and 54 preferably are configured as glue-laminated members that are formed of multiple elongate wood laminae 80 (e.g., boards) that are bonded together along their lengths. Alternatively, flanges 52 and 54 may be laminated veneer, parallel strand wood, solid sawn and finger jointed wood, or any other suitable wood or manufactured wood material, such as particle and fiber boards manufactured using small wood wafers (chips, saw dust, shavings, flakes, wafers, or strands) mixed with an adhesive (numerous types of adhesives used) and formed on a mat and pressed at the required pressure and temperature to cure the adhesive. At least one layer of fiber reinforcement 86 is adhered to at least one of lamina 80 in at least one of flanges 52 and 54. Preferably, fiber reinforcement 86 has a thickness of 0.008–0.070 inch (0.20–1.8 mm) is adhered between a pair of laminae 80 in each of flanges 52 and 54. Alternatively, fiber reinforcement 86 is adhered as an outermost layer of at least one of flanges 52 and 54 (FIG. 7).

For example, fiber reinforcement 86 may be adhered to outer lateral surfaces of flanges 52 and 54. As shown in FIG. 4, at least one layer of fiber reinforcement 86 is adhered between two pairs of laminae 80 on opposed sides of plane 59 in each of flanges 52 and 54. In each of these embodiments, multiple layers of fiber reinforcement 86 may be used to provide selected amounts of reinforcement. Alternatively, fiber reinforcement could be applied to only one of flanges 52 and 54.

Figure 5:
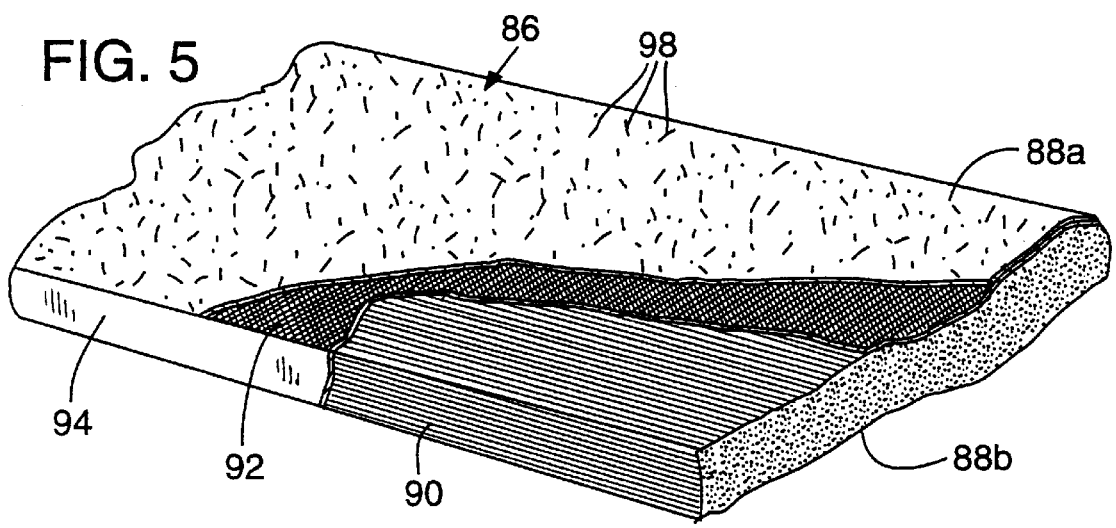
FIG. 5 is a perspective end view of an exemplary fiber reinforcement for use in the metal web wood I-beam of FIG. 2.

FIG. 5 is an enlarged perspective view of one layer of preferred fiber reinforcement 86. Fiber reinforcement 86 is preferably generally flat and thin and includes an opposed pair of major surfaces 88a and 88b. As used in wood I-beam 50, fiber reinforcements 86 are oriented with major surfaces 88a and 88b transverse to major surfaces 68 and 72 of respective flanges 52 and 54. Fiber reinforcements 86 also are oriented with major surfaces 88a and 88b not intersecting, and preferably generally parallel to, web plane 59 and the direction of load.

Fiber reinforcement 86 has a large number of fibers 90 that are arranged parallel to one another, aligned with the lengths of reinforcement 86, and have relatively high moduli of elasticity in tension or compression. Fibers 90 are preferably surrounded by a large number of fibers 92 that are woven together and include fibers at off-axis angles relative to the length of reinforcement 86, such as at opposed angles of ±30° and ±60° or ±45°. Woven fibers 92 provide enhanced resistance to cleavage of flanges 52 and 54 from pressure exerted on them by metal pins 74 securing metal tubes 56.

Fibers 92 comprise up to about 35 percent of the combined total weight of fibers 90 and 92 in reinforcement 86, but preferably comprise between about 5 percent and 15 percent. Alternatively, woven fibers 92 could form a core of reinforcement 86 enveloped by multiple longitudinal fibers 90 are positioned. A resin material 94 surrounds and extends into the interstices between fibers 90 and 92 to maintain them in their arrangement and alignment. To facilitate their adhesion to wood laminae 80, reinforcement 86 is preferably manufactured and treated as described in copending U.S. patent application Ser. No. 08/037,580, filed Mar. 24, 1993, which is hereby incorporated by reference.

Fiber reinforcement 86 with fibers 90 with relatively high moduli of elasticity in tension or compression are preferably positioned on flanges 52 and 54 according to whether they are subjected primarily to respective tensile or compressive stresses. Under the load conditions shown in FIG. 2, wood flanges 52 and 54 are in the regions of greatest tensile and compressive stress, respectively, within metal web wood I-beam 50.

Generally, fiber reinforcements 86 are positioned so that metal pins 74 extend through reinforcement major surfaces 88a and 88b. As a result, fiber reinforcements 86 provide wood flanges 52 and 54 with enhanced resistance to cleavage or shearing in the direction of load 78 by metal pins 74 and strengthen flanges 52 and 54 in the vicinity of localized discontinuities, such as at finger joint s 84 where sections 82 of wood flanges 52 and 54 are joined end-to-end, as well as at localized wood discontinuities such as knots and slope of grain variations (not shown).

The arrangement of fibers 90 and 92 cooperate to provide fiber reinforcement 86 with maximal strength characteristics. Longitudinal fibers 90 function primarily to enhance the tensile and compressive load bearing capabilities of respective flanges 52 and 54. Off-axis fibers 92 function primarily to enhance the resistance of flanges 52 and 54 to cleavage or shearing by metal pin 74.

Suitable for use as longitudinal fibers 90 surrounded by off-axis fibers 92 are aramid fibers, which are commercially available from E.I. DuPont de Nemours & Co. of Delaware under the trademark "KEVLAR," commercially available carbon fibers, high modulus polyethylene which is available under the trademark "SPECTRA" from Allied Fibers of Allied Signal, Petersberg, Va., and fiberglass fibers.

A preferred grade of fibers 90 and 92 is an aramid fiber available as "KEVLAR 49." Resin material 94 used in fabrication of reinforcement 86 is preferably an epoxy resin, but could alternatively include other resins such as polyester, vinyl ester, phenolic resins, polyimides, or thermoplastic resins such as polyethylene terephthalate (PET), nylon-66, or polystyrylpyridine (PSP).

Reinforcements 86 are preferably adhered to wood laminae and each other with nonepoxy adhesives, such as malamine including cross-linked malamine, resorcinol, formaldehyde resorcinol, phenol resorcinol, PVA including cross-linked PVA, isocyanates, polyurethane, and urea-based adhesives. Nonepoxy adhesives, such as the ones listed above, are preferred in part because they are the same nonepoxy adhesives typically used in manufacturing structural wood members. As a result, manufacturing efficiency is improved by employing the same adhesive for bonding wood segments and reinforcements.

As described in copending U.S. patent application Ser. No. 08/037,580, filed Mar. 24, 1993, which is hereinabove incorporated by reference, the major surfaces of reinforcements 86 are abraded or "haired up" so that adjacent fibers 92 are broken and their ends 98 protrude from resin material 94. The abrading removes a small portion of the resin encasement and exposes fibers that are closest to the surface. Further abrading breaks individual fibers so that one end of the fiber protrudes from the resin encasement providing the hairy surface.

Another method of hairing up the surface is by chemically treating the surface of the panel prior to curing the resin so as to cause voids in the surface of the panel as it emerges from a curing die thereby removing portions of the resin and exposing underlying fibers. Alternatively, broken rovings may by used to create the hairy surface.

It will be appreciated that other surface treatment methods, such as chemical ones of the type described in the inventor's Pat. No. 5,498,460, could be used so that reinforcement 86 can be adhered to wood or each other with non-epoxy adhesives. In such a treatment solid particulates, such as chalkdust or clay, are added to the resin and abraded away after the resin cures leaving voids. Alternatively, an agent which may include a particulate solid or spritzed liquid material is applied to the matrix bath in its monomer form encasing the reinforcing fibers prior to resin encasement and generates, forms, or becomes a nonreactive gas upon heating or other processing creating recesses.

Fibers 90 and 92 for use under tensile loads preferably have a modulus of elasticity in tension that is relatively high. For example, fibers 90 or 92 of Kevlar™ have a modulus of elasticity in tension of about $18 \times 10^6$ psi (124,000 MPa). Fiber reinforcement 86 comprising about 60 percent fibers 90 and 92 to about 40 percent resin material 94 (by volume) has a modulus of elasticity in tension parallel to major surfaces 88a and 88b of between about $9 \times 10^6$ psi and $13 \times 106$ psi (75,900 to 110,000 MPa).

Fibers 90 and 92 for use under compressive loads preferably have a modulus of elasticity in compression that is relatively high. For example, fibers 90 or 92 of carbon have a modulus of elasticity in compression of about $30 \times 10^6$ psi (206,900 MPa). Fiber reinforcement 86 comprising a core of about 50 percent fibers 90 of carbon, an envelope of about 10 percent fibers 92 of aramid, and about 40 percent resin material 94 (by volume) has a modulus of elasticity in compression of between about $14 \times 10^6$ psi and $18 \times 10^6$ psi (124,000 to 160,000 MPa).

In some structural applications, the loads applied to metal web wood I-beam 50 are reversible so that in one instance flanges 52 and 54 are subjected to respectively tensile and compressive stresses but at another instance the stresses are reversed. Under these conditions, I-beam 50 typically must be balanced with regard to its ability to bear tensile and compressive loads. Fiber reinforcement 86 with fibers 90 of an aramid alone would typically be unable to meet this requirement for balance.

Fiber reinforcement 86 with fibers 90 and 92 of an aramid alone has substantially less strength and a much lower modulus of elasticity in compression than in tension. This wide disparity in the compressive and tensile characteristics of aramids makes them undesirable for use in balanced load situations. In contrast, fiber reinforcement 86 predominantly of carbon fibers 90 or 92 has substantially similar strength and modulus of elasticity characteristics in compression and in tension. As a result, fiber reinforcement 86 predominantly with carbon fibers 90 or 92 could be positioned as shown in FIG. 4 in a balanced load application.

Reinforcement predominantly with fiberglass fibers 90 and 92 also has substantially similar strength and modulus of elasticity characteristics in compression and in tension, although lower than those for carbon, and could be used in reinforcement 86 in a balanced load application. Due to the relatively poor adhesion of carbon fibers directly to wood with the preferred adhesives, fibers of aramid, fiberglass, or high modulus polyethylene preferably are employed in the outermost layer of fibers in reinforcement 86.

Fiber reinforcements 86 and their orientations provide metal web wood I-beam 50 with a variety of other improved characteristics. Fiber reinforcements 86 in flange 52 improve its bearing resistance to load 78 and the bearing resistance to the load imposed by blocks 76 supporting I-beam 50 without increasing the size of flange 52. In conventional steel web wood I-beams, failure of flange 52 in the vicinity of metal pins 74 nearest blocks 76 supporting I-beam 50 is a common load limiting characteristic.

Fiber reinforcements 86 also allow flanges 52 and 54 to be attached at fewer locations to metal web 56 without metal pins 74 causing excessive shearing or cleavage of flanges 52 and 54. More specifically, fiber reinforcements 86 increase by up to about 70–80 percent the loads flanges 52 and 54 can bear at metal pins 74, thereby reducing the number of locations at which metal webs 56 need be attached to flanges 52 and 54 and providing corresponding improvements in manufacturing efficiency. Such a large reduction in the number of connections in a conventional steel web wood I-beam would unacceptably weaken its wood flanges due to increased shearing or cleavage at the remaining metal pins.

Fiber reinforcements 86 also prevent flanges 52 and 54 and therefore I-beam 50 from completely failing when subjected to extreme load conditions, in contrast to the typical response of conventional steel web wood I-beams under such conditions. The failure mode in conventional steel web wood I-beams is in moment failure. Fiber reinforcements 86 allow I-beam 50 to undergo ductile-type failure under extreme conditions, thereby providing improved safety characteristics because of reduced likelihood of ultimate failure.

It will be appreciated that metal web wood I-beam 50, as well as conventional steel web wood I-beams, are designed to bear loads primarily in the direction of load 78. As a result, metal web wood I-beams subjected to transverse loads of even relatively low magnitude frequently fail. Such transverse loads can occur, for example, when an I-beam inadvertently falls over during its manufacture or installation. Fiber reinforcements 86 prevent such inadvertent low magnitude transverse loads from damaging metal web wood I-beam 50 by preventing flanges 52 and 54 from buckling under such loads.

Metal web wood I-beam 50 can be manufactured with flanges 52 and 54 of wood grades lower than those typically required while having comparable or greater strength than a conventional steel web wood I-beam with conventional high grade wood flanges. For example, the wood flanges of a conventional steel web wood I-beam would be Douglas fir of a grade of at least 2400 psi design strength. In contrast, metal web wood I-beam 50 with flanges 52 and 54 of Douglas fir of a grade of as low as 300 psi design strength would typically be as strong or stronger than the conventional steel web wood I-beam. Moreover, flanges 52 and 54 primarily of solid sawn Douglas fir and reinforcement 86 are a cost effective substitute for metal web wood I-beam flanges of laminated veneer wood.

Knots in wood flanges subjected to compression or tension can function as localized initiation sites for lateral or horizontal buckling of the flange and the beam. Preferably, wood flange 86b under the load condition shown in FIG. 2 is substantially free of knots.

Fiber reinforcements 86 provide metal web wood I-beam 50 with improved tensile and compressive stress bearing capabilities, which increase the overall strength of metal web wood I-beam 50. In addition, fiber reinforcements 86 provide metal web wood I-beam 50 with enhanced stiffness.

For example, fiber reinforcements 86 amounting to about 1.5 percent of the volume of flanges 52 and 54 enhance the stiffness of metal web wood I-beam 50 by up to about 200 percent. Fiber reinforcements 86 provide such relatively large enhancement of the stiffness of metal web wood I-beam 50 because they are positioned in the regions of greatest tensile and compressive stresses in I-beam 50.

Figure 6:
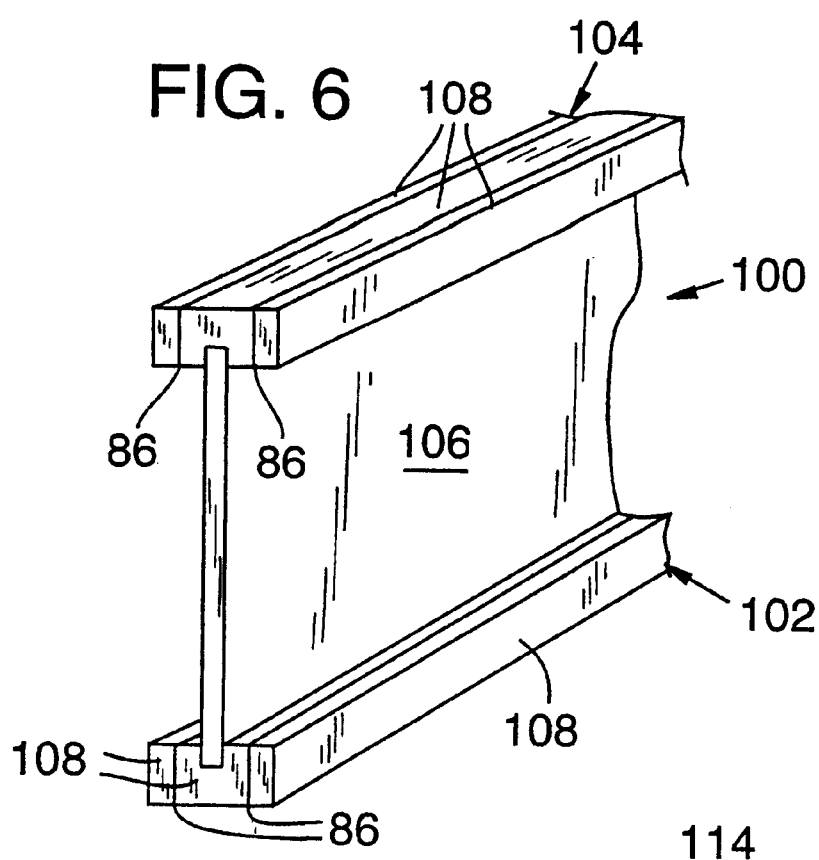
FIG. 6 is a diagrammatic view of a portion of an oriented strand board wood I-beam with reinforcement according to the present invention.

FIG. 6 is a diagrammatic view of an oriented strand board (OSB) web wood I-beam 100 of the present invention that includes an opposed pair of elongated wood flanges 102 and 104 that have positioned between them an oriented strand board 106. Flanges 102 and 104 are configured substantially similar to respective flanges 52 and 54 of metal web I-beam 50, except for any modifications needed because of the different web material, such as a continuous slot. It will be appreciated that a plywood board could be substituted for oriented strand board 106.

As described with reference to metal web wood I-beam 50, at least one layer of fiber reinforcement 86 is adhered to at least one of flanges 102 and 104 and is preferably adhered between a pair of wood segments 108 in each of flanges 102 and 104, as described with reference to metal web wood I-beam 50. Also, flanges 102 and 104 may be formed of the same wood product materials as are suitable for flanges 52 and 54 and may employ the same adhesives.

FIG. 7 is a diagrammatic view of a plywood web wood I-beam 110 of the present invention that includes an opposed pair of elongated wood flanges 112 and 114 that have positioned between them a plywood web 116. Flanges 112 and 114 are configured substantially similar to respective flanges 52 and 54 of metal web I-beam 50, except for any modifications needed because of the different web material, such as a continuous slot. It will be appreciated that an oriented strand board (OSB) could be substituted for plywood board 116.

As described with reference to metal web wood I-beam 50, at least one layer of fiber reinforcement 86 is adhered to at least one of flanges 112 and 114 and is preferably adhered between a pair of wood segments 118 in each of flanges 112 and 114, as described with reference to metal web wood I-beam 56. However, reinforcement 86 is oriented parallel to major surfaces 120 and 122 of respective flanges 112 and 114. An alternate placement of the reinforcement is on the outer major surface of at least one of the flanges as seen in FIG. 7, which shows a portion of reinforcement 86a adhered to upper surface 122 of flange 114. Although FIG. 7 shows both reinforcement 86 and 86a, the I-beam 110 may be constructed with either reinforcement 86 or 86a alone. Furthermore, either or both reinforcements 86 and 86a may be adhered to the bottom flange 112 only or in addition to being adhered to upper flange 114. Thus, depending on the application, various arrangements may be made with the reinforcements 86 and 86a and the upper and lower flanges 112 and 114.

In order to provide an effective bond, the reinforcements 86 and 86a may have a major surface that facilitates bonding to their respective flange. This may be achieved by sanding or chemically treating the major surface of the reinforcement to create surface characteristics formed to facilitate adhesion. Such surface characteristics may include recesses, protruding fibers or other surface area-increasing characteristics. This may be achieved during or after manufacture of the reinforcement. Surface area-increasing characteristics may also include the use of discontinuous fibers randomly arranged in the adhesive glue line between the reinforcements and the flanges. Flanges 112 and 114 may be formed of the same wood product materials as are suitable for flanges 52 and 54 and may employ the same adhesives. The reinforcement 86 is shown extending the entire length of the beam 56. However, it is contemplated that the reinforcement 86 only extend partially along the beam length, such as, for example, to cover two-fifths to three-fifths of the central portion of the beam 56.

Those having skill in the art will understand that many changes may be made to the details of the above-described embodiment of this invention without departing from the underlying principles thereof. The scope of the present invention should be determined, therefore, only by the following claims.

What is claimed is:

1. In a wood structural I-beam having first and second flanges that include wood and are spaced apart by a transverse web segment that defines a web plane through the flanges, each flange having opposed main flange faces transverse to the web plane, the improvement comprising:
   a first reinforcement panel having plural fiber strands held within a resin matrix, the first reinforcement panel having a pair of opposed reinforcement major faces, at least one of the major faces having surface characteristics formed specifically to facilitate adhesion of the first reinforcement panel to the wood I-beam, the first reinforcement panel being adhered with its major face aligned transverse to the web plane to the first flange.

2. The wood I-beam of claim 1 in which the first reinforcement panel is adhered to the first flange so that one of the major faces of the first reinforcement panel forms an upper surface of the first flange with its reinforcement major faces aligned transverse to the web axis.

3. The wood I-beam of claim 2 in which the first reinforcement panel is one of multiple reinforcement panels adhered to the first flange.

4. The wood I-beam of claim 1 in which the plural fiber strands include strands of different first and second fibers.

5. The wood I-beam of claim 4 in which the second fibers are arranged as a mat of fiber strands that overlays the first fibers, the mat including fiber strands arranged obliquely to a longitudinaly axis of the I-beam and substantially all the first fibers are arranged substantially parallel with one another and aligned with the longitudinal axis.

6. The wood I-beam of claim 5 in which the first fibers are selected from a group consisting of carbon, high modulus polyethylene, and fiberglass fibers and the second fibers include aramid fibers.

7. The wood I-beam of claim 1 further comprising a second reinforcement panel having plural fiber strands held within a resin matrix, the second reinforcement panel having a pair of opposed reinforcement major faces, at least one of the major faces having surface characteristics formed specifically to facilitate adhesion of the second reinforcement panel to the wood I-beam, the second reinforcement panel being adhered to the second flange with its major face aligned transverse to the web plane.

8. The wood I-beam of claim 7 in which the second reinforcement panel is one of multiple reinforcement panels adhered to the second flange.

9. The wood I-beam of claim 7 in which the plural fiber strands include strands of different first and second fibers.

10. The wood I-beam of claim 9 in which the second fibers are arranged as a mat of fiber strands that overlays the first fibers, the mat including fiber strands arranged obliquely to a longitudinaly axis of the I-beam and substantially all the first fibers are arranged substantially parallel with one another and aligned with the longitudinal axis.

11. The wood I-beam of claim 10 in which the first fibers are selected from a group consisting of carbon, high modulus polyethylene, and fiberglass fibers and the second fibers include aramid fibers.

12. The wood I-beam of claim 1 wherein the first and second flanges are composed of wood fibers held together in a resin matrix.

13. The wood I-beam of claim 1 wherein the web segment is composed of wood fibers held together in a resin matrix.

14. The wood I-beam of claim 7 wherein at least one of the first reinforcement panel and the second reinforcement panel is adhered to the first flange and the second flange, respectively, with a nonepoxy adhesive selected from the group of malamine including cross-linked malamine, resorcinol, formaldehyde resorcinol, phenol resorcinol, PVA including cross-linked PVA, isocyanates, polyurethane, and urea-based adhesives.

15. The wood I-beam of claim 14 wherein the wood I-beam is adhered together with the nonepoxy adhesive.

16. The wood I-beam of claim 7 wherein at least one of the first and second enforcement panels has a thickness of about 0.008–0.070 inch (0.20–1.8 mm).

17. The wood I-beam of claim 7 wherein at least one of the first and second reinforcement panels has a length less than a length of the I-beam.

18. The wood I-beam of claim 1 wherein the first and second flanges have finished widths reduced from an original width.

19. The wood I-beam of claim 1 having a length and the first and second flanges include wood having wood grain oriented along the length of the wood I-beam.

20. In a wood structural I-beam having a length and first and second flanges, the flanges being spaced apart by a transverse web segment that defines a web plane through the flanges, in which the first flange has a pair of opposed main flange faces transverse to the web plane, the improvement comprising:
   a first reinforcement panel having plural fiber strands held within a resin matrix, the first reinforcement panel being adhered to the first flange between the opposed main flange faces of the first flange, wherein the first reinforcement panel has a generally thin, flat configuration and is adhered with a major reinforcement major face aligned transverse to the web plane.

21. The wood I-beam of claim 20 in which the first reinforcement panel has opposed reinforcement major faces at least one of the major faces having surface characteristics formed specifically to facilitate adhesion of the first reinforcement panel to the wood structural I-beam.

22. The wood I-beam of claim 20 in which the first reinforcement panel is one of multiple reinforcement panels adhered to the first flange.

23. The wood I-beam of claim 20 in which the plural fiber strands include strands of different first and second fibers.

24. The wood I-beam of claim 23 in which the second fibers are arranged as a mat of fiber strands that overlays the first fibers, the mat including fiber strands arranged obliquely to a longitudinaly axis of the I-beam and substantially all the first fibers are arranged substantially parallel, with one/another and aligned with the longitudinal axis.

25. The wood I-beam of claim 24 in which the first fibers are selected from a group consisting of carbon, high modulus polyethylene, and fiberglass fibers and the second fibers include aramid fibers.

26. The wood I-beam of claim 20 further comprising a second reinforcement panel having plural fiber strands held within a resin matrix, the second reinforcement panel having a pair of opposed reinforcement major faces, at least one of the major faces having surface characteristics formed specifically to facilitate adhesion of the second reinforcement panel to the wood I-beam, the second reinforcement panel being adhered to the second flange with its major face aligned transverse to the web plane.

27. The wood I-beam of claim 26 in which the second reinforcement panel is one of multiple reinforcement panels adhered to the second flange.

28. The wood I-beam of claim 26 in which the plural fiber strands include strands of different first and second fibers.

29. The wood I-beam of claim 26 in which the second fibers are arranged as a mat of fiber strands that overlays the first fibers, the mat including fiber strands arranged obliquely to a longitudinaly axis of the I-beam and substantially all the first fibers are arranged substantially parallel with one another and aligned with the longitudinal axis.

30. The wood I-beam of claim 26 wherein at least one of the first reinforcement panel and the second reinforcement panel is adhered to the first flange and the second flange, respectively, with a nonepoxy adhesive selected from the group of malamine including cross-linked malamine, resorcinol, formaldehyde resorcinol, phenol resorcinol, PVA including cross-linked PVA, isocyanates, polyurethane, and urea-based adhesives.

31. The wood I-beam of claim 30 wherein the wood I-beam is adhered together with the nonepoxy adhesive.

32. The wood I-beam of claim 20 wherein the first and second flanges are composed of wood fibers held together in a resin matrix.

33. The wood I-beam of claim 20 wherein the wood I-beam is adhered together with the nonepoxy adhesive.

34. The wood I-beam of claim 20 wherein the web segment is composed of wood fibers held together in a resin matrix.

35. The wood I-beam of claim 20 wherein at least one of the first and second reinforcement panels has a thickness of about 0.008–0.070 inch (0.20–1.8 mm).

36. The wood I-beam of claim 20 wherein at least one of the first and second reinforcement panels has a length less than a length of the I-beam.

37. The wood I-beam of claim 20 wherein the first and second flanges have finished widths reduced from an original width.

\* \* \* \* \*